(12) United States Patent
Lawandy

(10) Patent No.: US 11,747,268 B2
(45) Date of Patent: *Sep. 5, 2023

(54) CODED POLYMER SUBSTRATES FOR BANKNOTE AUTHENTICATION

(71) Applicant: Spectra Systems Corporation, Providence, RI (US)

(72) Inventor: Nabil Lawandy, Saunderstown, RI (US)

(73) Assignee: Spectra Systems Corporation, Providence, RI (US)

( * ) Notice: Subject to any disclaimer, the term of this patent is extended or adjusted under 35 U.S.C. 154(b) by 726 days.

This patent is subject to a terminal disclaimer.

(21) Appl. No.: 15/909,170

(22) Filed: Mar. 1, 2018

(65) Prior Publication Data

US 2018/0252637 A1    Sep. 6, 2018

Related U.S. Application Data

(60) Provisional application No. 62/465,587, filed on Mar. 1, 2017.

(51) Int. Cl.
*G01N 21/23* (2006.01)
*G07D 7/1205* (2016.01)
(Continued)

(52) U.S. Cl.
CPC ........... *G01N 21/31* (2013.01); *G01N 21/554* (2013.01); *G07D 7/10* (2013.01); *G07D 7/12* (2013.01);
(Continued)

(58) Field of Classification Search
CPC ...... B42D 25/29; B42D 25/36; B42D 25/351; G01N 21/31; G01N 21/84; G07D 7/1205;
(Continued)

(56) References Cited

U.S. PATENT DOCUMENTS

| 4,536,016 A | 8/1985 | Solomon et al. |
| 5,170,448 A | 12/1992 | Ackley et al. |

(Continued)

FOREIGN PATENT DOCUMENTS

| AU | 2013224649 | 10/2013 |
| EP | 2713329 A1 | 6/2011 |

(Continued)

OTHER PUBLICATIONS

Written Opinion of the International Searching Authority in PCT/US2018/020404 (dated Jun. 1, 2018).
(Continued)

*Primary Examiner* — Violeta A Prieto
(74) *Attorney, Agent, or Firm* — Pryor Cashman LLP

(57) ABSTRACT

A method and system for authenticating an item includes irradiating the item, the item including a polymer substrate including a polymer material and a doping material and configured to emit a radiation spectrum having a spectral signature in response to the irradiating, the doping material capable of absorbing or scattering radiation at a specific wavelength to generate the spectral signature, detecting the spectral signature, and determining a code associated with the spectral signature.

20 Claims, 7 Drawing Sheets

(51) Int. Cl.
  *B42D 25/29* (2014.01)
  *B42D 25/36* (2014.01)
  *G01N 21/31* (2006.01)
  *G07D 7/12* (2016.01)
  *G07D 7/202* (2016.01)
  *G01N 21/552* (2014.01)
  *G07D 7/10* (2006.01)
  *B42D 25/351* (2014.01)

(52) U.S. Cl.
  CPC ........... *G07D 7/1205* (2017.05); *G07D 7/205* (2013.01); *B42D 25/29* (2014.10); *B42D 25/351* (2014.10); *B42D 25/36* (2014.10); *G07D 2207/00* (2013.01)

(58) Field of Classification Search
  CPC ........ G07D 2207/00; G07D 7/10; G07D 7/12; G07D 7/205
  See application file for complete search history.

(56) References Cited

U.S. PATENT DOCUMENTS

| | | | |
|---|---|---|---|
| 5,449,200 | A | 9/1995 | Andric et al. |
| 6,373,965 | B1 | 4/2002 | Liang |
| 6,468,661 | B2 | 10/2002 | Benoit et al. |
| 6,536,672 | B1 | 3/2003 | Outwater |
| 6,552,290 | B1 | 4/2003 | Lawandy |
| 6,744,525 | B2 | 6/2004 | Goltsos |
| 6,806,478 | B1 | 10/2004 | Hatfield |
| 6,832,783 | B2 | 12/2004 | Lawandy |
| 7,040,663 | B1 | 5/2006 | Plaschka et al. |
| 7,044,376 | B2 | 5/2006 | Nelson et al. |
| 7,256,874 | B2 | 8/2007 | Csulits et al. |
| 7,605,372 | B2 | 10/2009 | Hachin et al. |
| 8,171,567 | B1 | 5/2012 | Fraser et al. |
| 8,445,866 | B2* | 5/2013 | Kane ................ C09K 11/02 250/458.1 |
| 8,530,863 | B2 | 9/2013 | Lawandy |
| 9,127,139 | B2 | 9/2015 | Guillou et al. |
| 9,598,821 | B2 | 3/2017 | Schaede |
| 9,739,597 | B2 | 8/2017 | Stewart |
| 9,878,572 | B2 | 1/2018 | Stewart et al. |
| 11,501,593 | B2* | 11/2022 | Lawandy ............... G07D 7/121 |
| 2003/0108074 | A1 | 6/2003 | Lawandy |
| 2005/0018013 | A1 | 1/2005 | Nelson et al. |
| 2005/0147807 | A1 | 7/2005 | Haas et al. |
| 2006/0196948 | A1* | 9/2006 | Weber ................ B42D 25/00 235/487 |
| 2007/0281141 | A1* | 12/2007 | Kohlweyer ............. B41M 1/18 428/207 |
| 2008/0291020 | A1* | 11/2008 | Rodgers ................ G06Q 10/08 340/572.1 |
| 2009/0116753 | A1 | 5/2009 | Midgley et al. |
| 2010/0140501 | A1 | 6/2010 | Lawandy |
| 2011/0147614 | A1 | 6/2011 | Kane et al. |
| 2012/0299287 | A1 | 11/2012 | Eichenberger |
| 2012/0314207 | A1* | 12/2012 | Bain ...................... G01B 11/06 356/73 |
| 2013/0056972 | A1 | 3/2013 | Muller et al. |
| 2013/0106092 | A1 | 5/2013 | Holmes |
| 2013/0122266 | A1 | 5/2013 | Kane et al. |
| 2013/0155421 | A1* | 6/2013 | Langstaff ................ G07D 7/12 356/630 |
| 2013/0335732 | A1 | 12/2013 | Stewart |
| 2015/0287261 | A1 | 10/2015 | Pinchen et al. |
| 2015/0376841 | A1 | 12/2015 | Schaede |
| 2016/0102817 | A1 | 4/2016 | Leard et al. |
| 2016/0103065 | A1 | 4/2016 | Lee et al. |
| 2016/0140427 | A1 | 5/2016 | Keay |
| 2017/0028763 | A1 | 2/2017 | Arsenault et al. |
| 2017/0039794 | A1 | 2/2017 | Lawandy |
| 2017/0066280 | A1 | 3/2017 | Abe et al. |
| 2017/0100924 | A1 | 4/2017 | Read et al. |
| 2017/0299374 | A1 | 10/2017 | Stewart |
| 2018/0059018 | A1 | 3/2018 | Lee |
| 2018/0293830 | A1 | 10/2018 | Stewart |
| 2018/0357455 | A1 | 12/2018 | Roach et al. |

FOREIGN PATENT DOCUMENTS

| | | |
|---|---|---|
| RU | 2412486 | 2/2011 |
| WO | 2018215774 A1 | 11/2018 |

OTHER PUBLICATIONS

International Search Report in PCT/US2018/020404 (dated Jun. 1, 2018).

Lee, "A Survey on Banknote Recognition Methods by Various Sensors" Sensors, 2017, vol. 17, pp. 1-32.

Roy, "Authentication of Currency Notes Through Printing Technique Verification" ResearchGate, 2010, pp. 1-9.

Supplementary European Search Report in European Application No. 20897213.3 (dated Jan. 5, 2023).

Jasco, Inc., "Fluorescence Detection of Counterfeit US Currency," Molecular Spectroscopy (Feb. 2004).

Jasco, Inc., "Fluorescence Detection of Counterfeit US Currency," Application Note (Undated).

* cited by examiner

US 11,747,268 B2

CODED POLYMER SUBSTRATES FOR BANKNOTE AUTHENTICATION

CROSS-REFERENCE TO RELATED APPLICATIONS

This application claims priority to U.S. provisional application Ser. No. 62/465,587, filed Mar. 1, 2017.

TECHNICAL FIELD

The present invention relates generally to apparatus and methods for coding items with polymer substrates including doping materials, the codes being detectable in the form of patterned radiation spectra in response to incident radiation.

BACKGROUND OF THE INVENTION

Counterfeiting is a growing concern and, as a result, secure instruments such as banknotes typically have three levels of authentication. Level I authentication is for public uses and is typically in the form of an optical effect, such as optically variable ink or security threads with optical characteristics that are relatively unique and difficult to duplicate. These Level I authentication features include holographic threads and lenticular lens array security threads. Paper banknotes have included Level I authentication features in the form of watermarks.

Similar to Level I authentication features, Level II authentication features are typically known to the public and commercial banks, and include features such as magnetics and fluorescent and phosphorescent inks, which can be read by simple sensors commonly used in ATMs and bill acceptors.

Level III security features are machine readable features and are more sophisticated than Level II authentication features. Level III security features are typically not known to the public and commercial banks and are used to protect against threats from state-sponsored counterfeiters and other well-funded organizations. The covert Level III authentication features are typically either in the form of inks or other features embedded in the substrate of the banknotes.

Over the last two decades, polymer banknotes have gradually been gaining market share in the banknote industry, with over thirty countries using polymer substrates including materials such as Biaxially Oriented Poly-Propylene (BOPP). The use of polymer substrates has been primarily restricted to lower denominations, as most of the Level III security features that have been employed within paper banknote substrates are not available or suitable for use with polymer banknotes.

The present invention concerns a new Level III security feature in the form of a machine readable technology for use with polymer banknotes.

SUMMARY OF THE INVENTION

In general, in one aspect, the invention features a method for authenticating an item, including irradiating the item, the item including a polymer substrate including a polymer material and a doping material and configured to emit a radiation spectrum having a spectral signature in response to the irradiating, the doping material capable of absorbing or scattering radiation at a specific wavelength to generate the spectral signature, detecting the spectral signature, and determining a code associated with the spectral signature.

Implementations of the invention may include one or more of the following features. The method may include comparing the determined code to a reference code or providing an indication of authenticity if the determined code matches the reference code. The spectral signature may be an absorption or scattering pattern in the radiation spectrum. The spectrum may include visible light or non-visible electromagnetic radiation.

The irradiating may include providing an incident spectrum. The polymer material may be biaxially oriented polypropylene. The doping material may be capable of absorbing or scattering radiation at a plurality of specific wavelengths to generate the spectral signature. The absorbed or scattered radiation at the plurality of specific wavelengths may have different intensities at each of the plurality of specific wavelengths.

The item may be currency. The method may include covering the polymer substrate with an opacity layer. The method may include matching an index of refraction of the doping material with an index of refraction of the polymer material.

In general, in another aspect, the invention features a system for authenticating an item, including a radiation source for irradiating the item, the item including a polymer substrate including a polymer material and a doping material and configured to emit a radiation spectrum having a spectral signature in response to the irradiating, the doping material capable of absorbing or scattering radiation at a specific wavelength to generate the spectral signature, and a sensor configured to detect the spectral signature.

Implementations of the invention may include one or more of the following features. The system may include a computing device for determining a code based on the spectral signature. The computing device may be configured to compare the determined code to a reference code and to determine whether the item is authentic based on the comparison of the determined code to the reference code.

The spectral signature may be an absorption or scattering pattern in the radiation spectrum. The doping material may be capable of absorbing or scattering radiation at a plurality of specific wavelengths to generate the spectral signature, the absorbed or scattered radiation having different intensities at each of the plurality of specific wavelengths, and the sensor configured to detect the intensities at each of the plurality of specific wavelengths in the spectral signature.

The sensor may include an imaging device of a smartphone or a tablet. The system may include a radiation source for providing an incident spectrum.

DETAILED DESCRIPTION OF THE PREFERRED EMBODIMENTS

Figure 1:
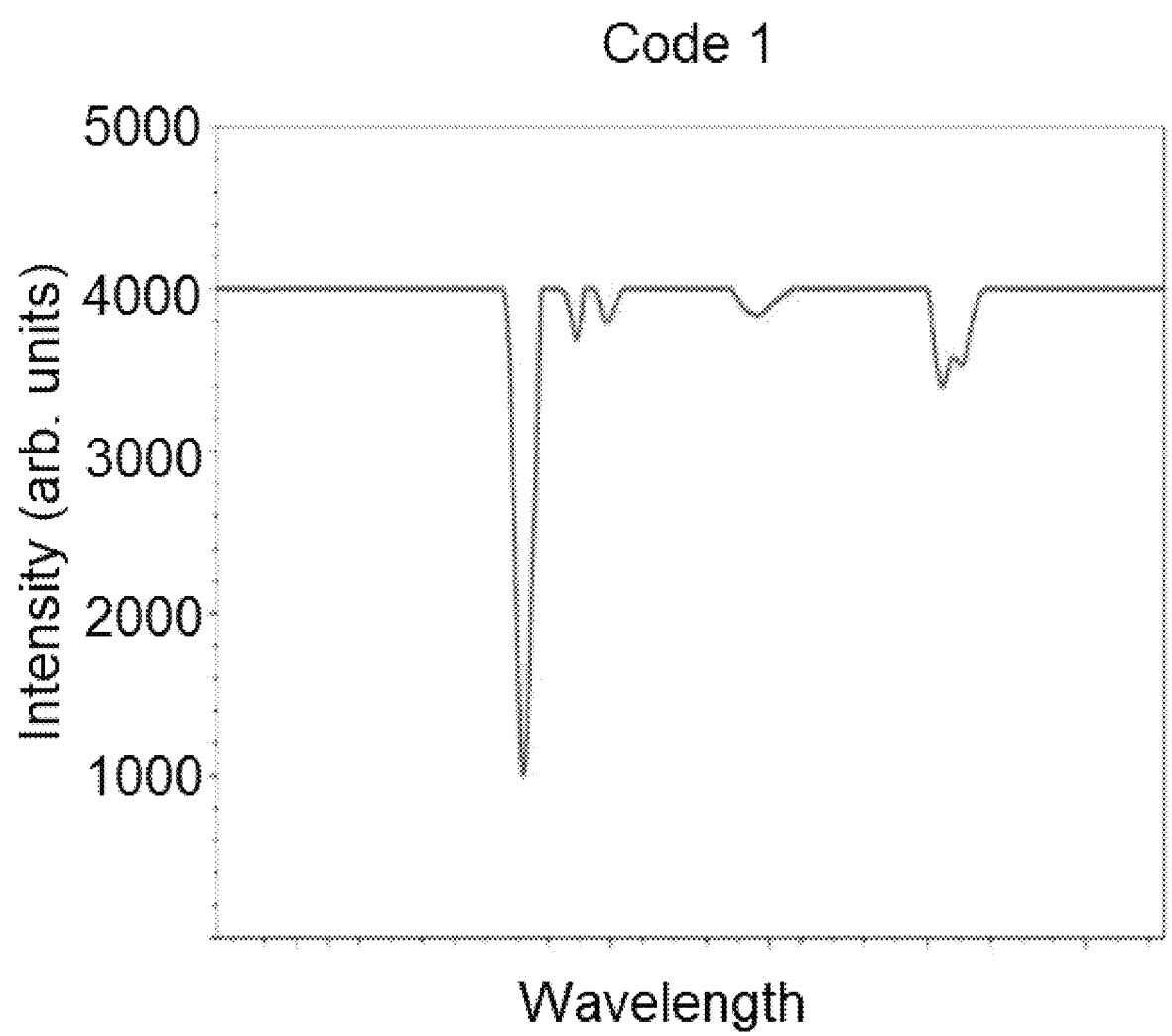
FIG. 1 is a graph showing a first code corresponding to the resulting spectral intensities after a band of incident radiation in the near infrared portion of the electromagnetic spectrum is transmitted through a clear 60 micron polymer layer including doping material.
Figure 2:
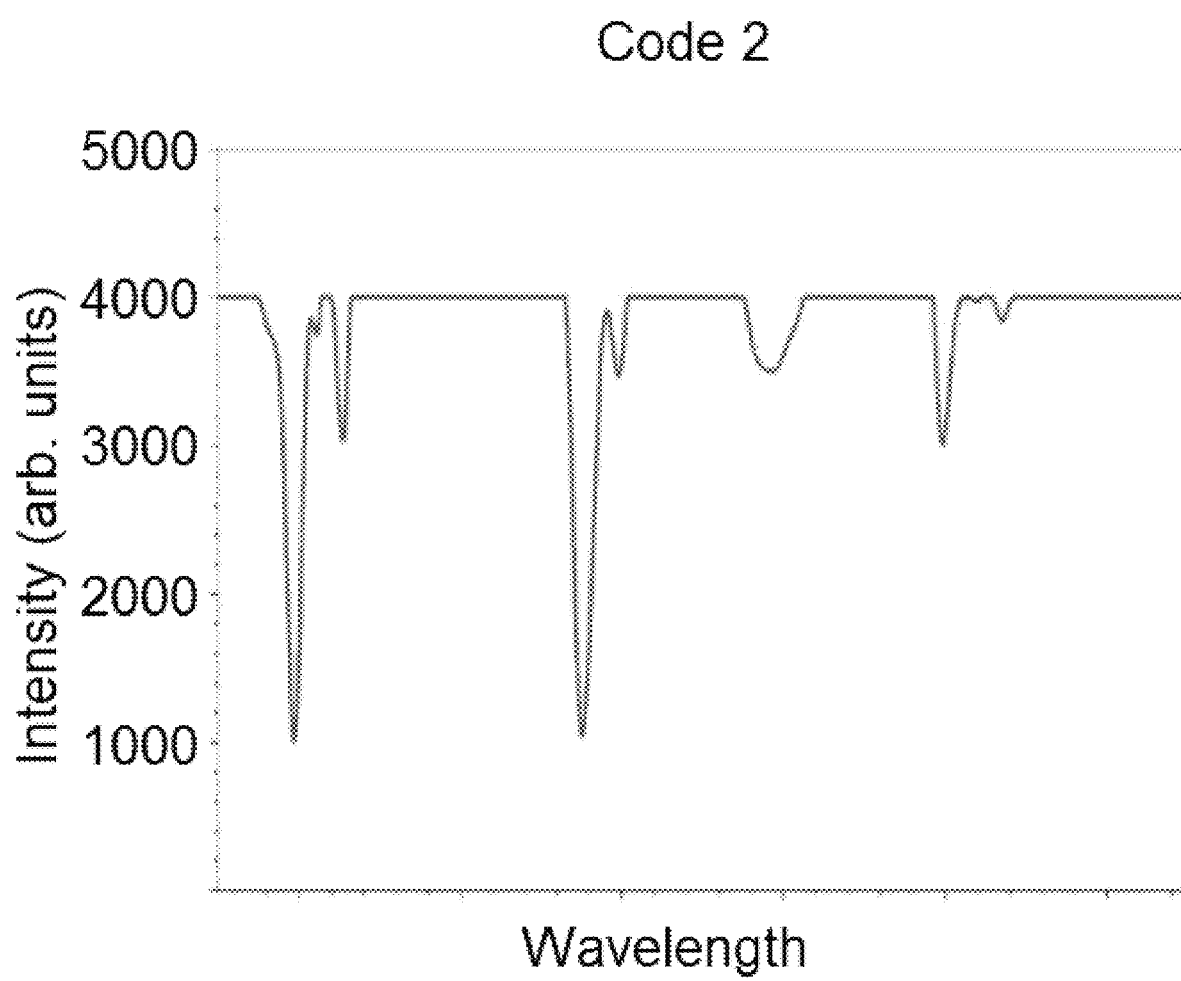
FIG. 2 is a graph showing a second code corresponding to the resulting spectral intensities after a band of incident radiation in the near infrared portion of the electromagnetic spectrum is transmitted through a clear 60 micron polymer layer including doping material.
Figure 3:
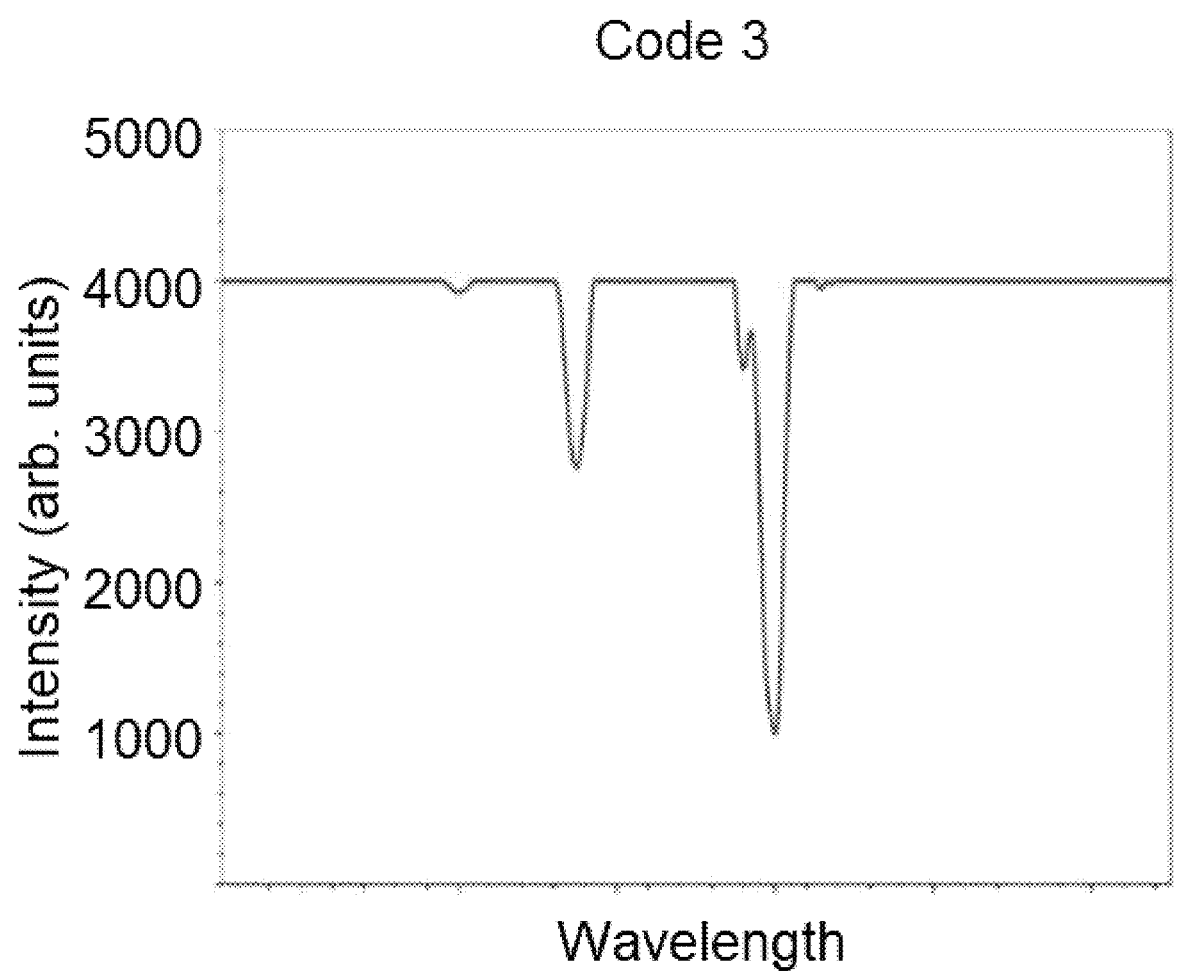
FIG. 3 is a graph showing a third code corresponding to the resulting spectral intensities after a band of incident radiation in the near infrared portion of the electromagnetic spectrum is transmitted through a clear 60 micron polymer layer with doping material.
Figure 4:
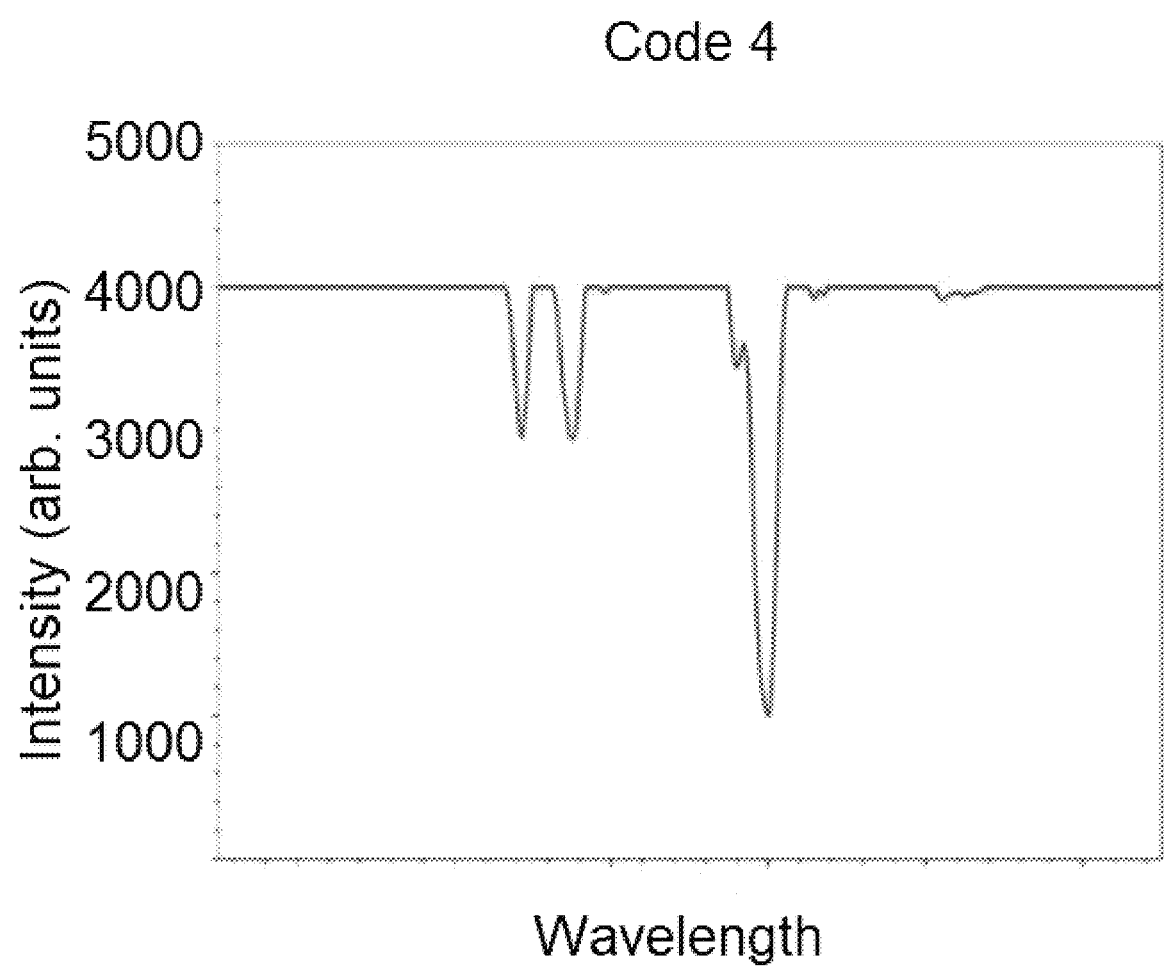
FIG. 4 is a graph showing a fourth code corresponding to the resulting spectral intensities after a band of incident radiation in the near infrared portion of the electromagnetic spectrum is transmitted through a clear 60 micron polymer layer with doping material.

The present invention provides for apparatus and methods for coding polymer substrates with the addition of doping materials, and authentication systems and methods using the coded polymer substrates. The coded polymer substrates may be used, e.g., for authenticating secure items, instruments or documents, such as banknotes or currency.

A polymer substrate employed in the present invention may be a BOPP layer. Such a BOPP substrate, as used in banknotes or currency, may be approximately 60 microns in thickness. In one embodiment, the polymer substrate may be covered with an opacity layer to allow for both contrast printing and discharge of static charges. In another embodiment, the polymer substrate may include a clear area or window free from opacity, as is often the case in higher denomination polymer banknotes. The opacity layer of the banknote, either alone or in combination with the area free from opacity, may function as the analog of paper banknote watermark for polymer banknotes.

Doping materials may be nanometer and micrometer materials added to the BOPP material. The doping materials may be added to the BOPP material during extrusion of the polymer layer. The doping materials are selected to be well matched to the index of refraction of the BOPP material and to maintain the clarity and transparency of the BOPP material.

The doping materials may be inorganics, organics, semiconductor and nanostructures exhibiting exciton, phonon polariton and plasmonic modes, and particularly those that can survive the extrusion temperatures of the BOPP material or other selected polymer material. The doping materials may be added to or loaded in the BOPP material at 0.01-10% loadings by weight. Most significantly, each doping material exhibits a unique absorptive or scattering property or signature in the spectrum of incident radiation transmitted through the BOPP material in the region from the far infrared to the long ultraviolet. In particular, the doping materials selectively absorb and/or scatter incident radiation at specific wavelengths. By combining specific absorption and/or scattering features of various doping materials, codes for authentication of the banknotes are created in the form of patterned spectra with notches or other non-uniform features, i.e., absorption or scattering patterns.

FIGS. 1-4 show spectra for a band of incident radiation in the near infrared portion of the electromagnetic spectrum transmitted through a clear 60 micron polymer layer with varying types and levels of doping materials. The intensities of radiation detected after transmission of incident radiation through the polymer layer vary from the otherwise substantially uniform intensity of the incident radiation over the band of wavelengths due to the presence of doping materials. The doping materials are selected to absorb and/or scatter radiation at predetermined wavelengths to create the notched and otherwise non-uniform detected spectral patterns.

Experiments have demonstrated the use of up to ten unique codes embedded in a spectrum of radiation transmitted through a BOPP material that further maintains excellent clarity in regions of the BOPP material lacking an opacity layer and is indistinguishable from un-doped BOPP material. Using shape and Fano resonance effects, metallic and semiconductor nanostructure resonances of doping materials can be tuned and manipulated to create a large array of codes. These codes may be specific to certain institutions, such as Central Banks. The codes may also be used to authenticate banknotes and/or determine the denominations of banknotes on high speed sorting machines, such as those manufactured by Geiseke and Devrient and De La Rue International.

Exemplary embodiments of the present invention are generally directed to devices, apparatus, systems, and methods for authentication using coded polymer substrates. Specifically, exemplary embodiments of the present invention use detecting/sensing mechanisms that may be used to authenticate items including a coded polymer substrate. Although the exemplary embodiments of the present invention are primarily described with respect to authentication and/or preventing counterfeiting, it is not limited thereto, and it should be noted that the exemplary coded polymer substrates may be used to encode other types of information for other applications. Further, the exemplary embodiments of the present invention may be used in conjunction with other authentication measures, e.g., holograms, watermarks, and magnetic encoding.

Figure 5:
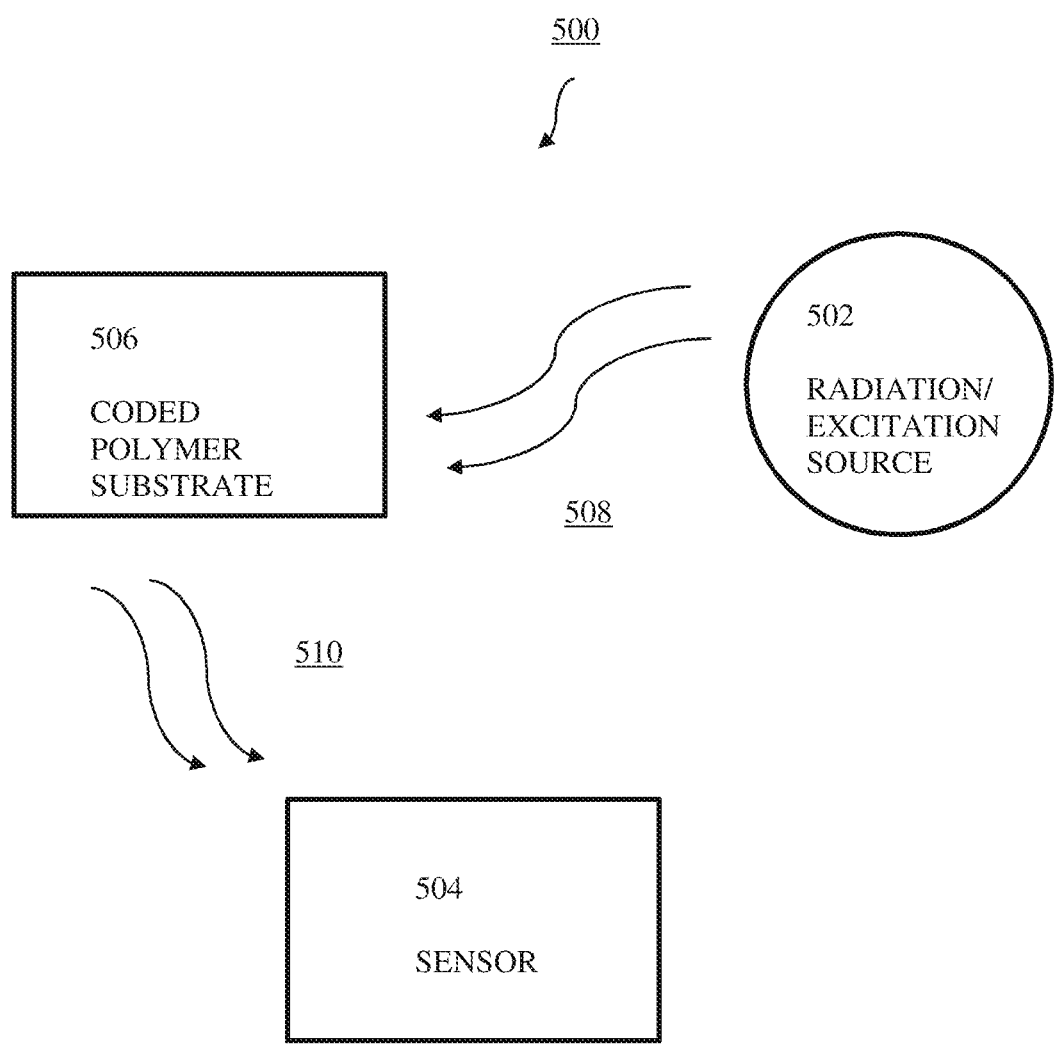
FIG. 5 shows an exemplary authentication system in accordance with embodiments of the invention.

FIG. 5 shows an exemplary system 500 in accordance with embodiments of the present invention. As shown in FIG. 5, system 500 may include a radiation/excitation source 502, a sensor 504, and a coded polymer substrate 506. Radiation/excitation source 502 may be any source supplying radiation 508, such as, e.g., visible light, ultraviolet radiation, radio waves, or microwaves, which is to be absorbed by the coded polymer substrate. The coded polymer substrate 506 may re-emit radiation 510 in the same wavelength range or emit radiation 510 in a different wavelength range.

Sensor 504 may include any detecting, sensing, imaging, or scanning device that is able to receive, image and/or measure the spectrum of the radiation emitted by the coded polymer substrate 504, such as a photometer or a digital camera.

According to certain exemplary embodiments of the present invention, radiation/excitation source 502 may include the flash of a digital camera, and sensor 504 may include the optical components and sensors of the digital camera. In one exemplary embodiment, the radiation/excitation source 502 may include the light source of a smartphone or tablet camera, e.g., Apple iPhone, Apple iPad, Samsung Galaxy or other Android devices, and sensor 504 may include the camera of the smartphone or tablet.

Coded polymer substrate 506 may be included in labels and may be attached or affixed to any product or item, e.g., tax stamps, apparel, currency, or footwear, for which authentication may be desirable.

Figure 6:
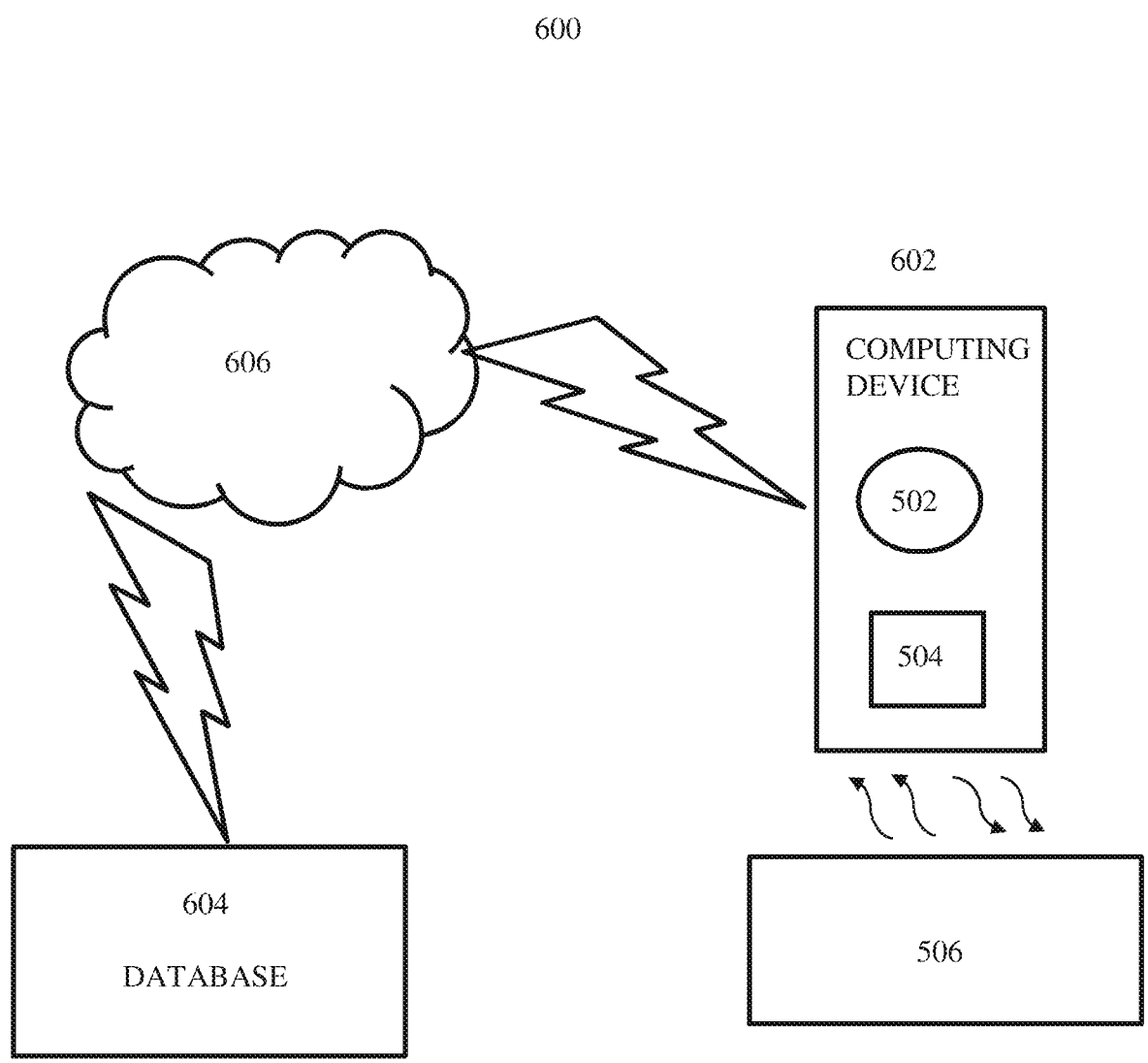
FIG. 6 shows an exemplary system that may be employed to authenticate an item using the method of the present invention.

FIG. 6 shows an exemplary system 600 that may be employed to authenticate an item using the coded polymer substrate described herein. For example, system 600 includes a computing device 602, which may include radiation/excitation source 502 and sensor 504. Computing device 602 may be any computing device that incorporates a radiation/excitation source 502 and sensor 504, such as a smartphone, a tablet, or a personal data assistant (PDA). Alternatively, radiation/excitation source 502 and sensor 504 may be stand-alone devices that operate independent of a computing device. As described herein, the radiation/excitation source 502 may irradiate a coded polymer substrate, and sensor 504 may measure the radiation emitted by the coded polymer substrate, including the spectral signature. The computing device 602 may then determine a code corresponding to the measured spectral signature of the radiation emitted by the coded polymer substrate. The processing of the measured spectral signature to determine the code may be performed by a remote computing device. Subsequently, the code or the measured spectral signature may be compared to a database of reference codes or spectral signatures. The database of reference codes may be stored locally on the scanning, imaging, or sensing device or remotely on a separate computing device.

As shown in FIG. 6, to complete the authentication, the computing device 602 may compare the code or the measured spectral intensities to the reference codes or spectral signature stored in a database 604. Although FIG. 6 illustrates this comparison being performed via a network 606 to a remote database 604, other embodiments contemplate database 604 being local to computing device 602.

Further, in some embodiments, the item being authenticated may include an identifying label, such as, e.g., a barcode, a QR code, or a magnetic code, to enable correlation of the code or the measured spectra to the item being authenticated. In a particular embodiment where computing device 602 is a smartphone or tablet, the transmission via the network 606 may be performed over a cellular data connection or a Wi-Fi connection. Alternatively, this can be performed with a wired connection or any other wired or wireless data transport mechanism.

Figure 7:
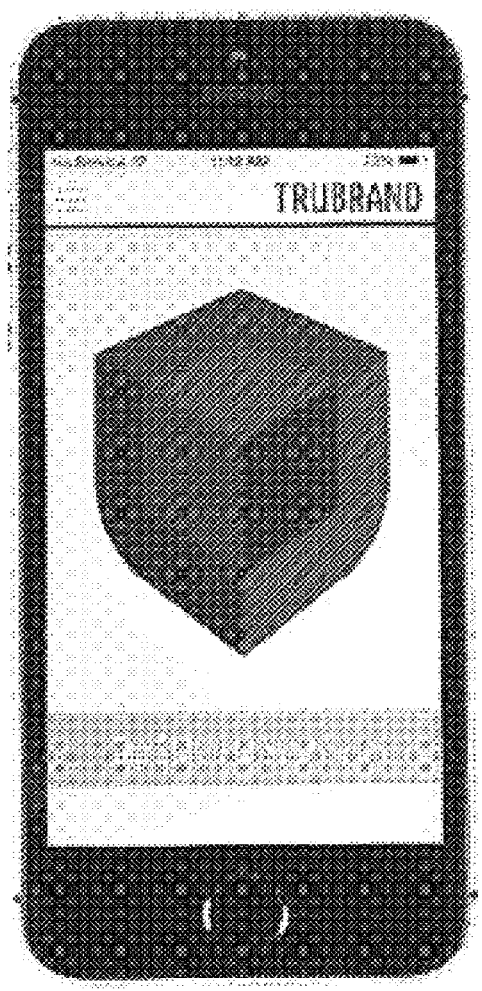
FIG. 7 shows an exemplary screen shot of a software application that may be utilized on a smartphone for authenticating an item in accordance with the present invention.

In certain embodiments of the present invention where a computing device, such as a smartphone or tablet, is utilized for authenticating an item, a software application may be used to simplify the authentication process. FIG. 7 shows a smartphone with an exemplary screen shot of a software application that may be utilized for authenticating an item. The exemplary application may be configured to be executed on any mobile platform, such as Apple's iOS or Google's Android mobile operating system. When the application is run, the software application may provide instructions to a user on properly irradiating or exciting the coded polymer substrate and scanning or imaging the spectrum emitted from the coded polymer substrate. Once the irradiating and scanning of the polymer substrate is complete, the application may facilitate comparison of the measured spectral signature and/or the measured code with a database that stores certain reference codes or spectral signatures to authenticate the item. Further, the application may provide a message or other indicator informing the user of the result of the authentication. For example, the application may provide a text, graphical, or other visual indicator on the screen of the smartphone showing the results of the authentication. Alternatively, the application may provide audible and/or tactile indicators conveying the results of the authentication.

The embodiments and examples above are illustrative, and many variations can be introduced to them without departing from the spirit of the disclosure or from the scope of the appended claims. For example, elements and/or features of different illustrative and exemplary embodiments herein may be combined with each other and/or substituted with each other within the scope of this disclosure. For a better understanding of the invention, its operating advantages and the specific objects attained by its uses, reference should be had to the accompanying drawings and descriptive matter in which there are illustrated exemplary embodiments of the invention.

What is claimed is:

1. A method for authenticating an item, comprising:
   providing the item including a polymer substrate comprising a polymer material and a doping material, the polymer substrate being transparent to visible spectrum radiation, the polymer material and the doping material configured to transmit radiation through the polymer substrate, and the doping material capable of absorbing and scattering radiation of at least one specific wavelength to generate a spectral signature including a notched pattern in a spectral band of wavelengths of the transmitted radiation;
   irradiating the item with incident radiation characterized by a spectral band of wavelengths spanning a band of wavelengths including the at least one specific wavelength absorbed and scattered by the doping material, the polymer substrate absorbing and scattering radiation of the incident radiation to generate the spectral signature in the spectral band of wavelengths of the incident radiation and transmitting the radiation having the generated spectral signature through the polymer substrate;
   detecting the spectral signature after the radiation is transmitted through the polymer substrate; and
   determining a code associated with the spectral signature.

2. The method of claim 1, further comprising
   comparing the determined code to a reference code.

3. The method of claim 2, further comprising
   providing an indication of authenticity if the determined code matches the reference code.

4. The method of claim 1, wherein the spectral signature is an absorption and scattering pattern in the spectral band of wavelengths of the incident radiation.

5. The method of claim 4, wherein the spectral band of wavelengths of the incident radiation includes visible light.

6. The method of claim 4, wherein the spectral band of wavelengths of the incident radiation includes non-visible electromagnetic radiation.

7. The method of claim 1, wherein the polymer material is biaxially oriented poly-propylene.

8. The method of claim 1, wherein the doping material is capable of absorbing and scattering radiation at a plurality of specific wavelengths to produce the spectral signature.

9. The method of claim 8, wherein the absorbed and scattered radiation at the plurality of specific wavelengths has different intensities at each of the plurality of specific wavelengths.

10. The method of claim 1, wherein the item is currency.

11. The method of claim 1, further comprising
    covering the polymer substrate with an opacity layer.

12. The method of claim 1, wherein the doping material is added to the polymer material at 0.01-10% loadings by weight.

13. A system for authenticating an item, comprising:
    the item including a polymer substrate comprising a polymer material and a doping material, the polymer substrate being transparent to visible spectrum radiation, the polymer material and the doping material configured to transmit radiation through the polymer substrate, and the doping material capable of absorbing and scattering radiation of at least one specific wavelength to generate a spectral signature including a notched pattern in a spectral band of wavelengths of the transmitted radiation;

a radiation source for irradiating the item with incident radiation characterized by a spectral band of wavelengths spanning a band of wavelengths including the at least one specific wavelength absorbed and scattered by the doping material, the polymer substrate absorbing and scattering radiation of the incident radiation to generate the spectral signature in the spectral band of wavelengths of the incident radiation and transmitting the radiation having the generated spectral signature through the polymer substrate; and a sensor configured to detect the spectral signature after the radiation is transmitted through the polymer substrate.

14. The system of claim 13, further comprising a computing device for determining a code associated with the spectral signature.

15. The system of claim 14, wherein the computing device is configured to compare the determined code to a reference code and to determine whether the item is authentic based on the comparison of the determined code to the reference code.

16. The system of claim 13, wherein the spectral signature is an absorption and scattering pattern in the spectral band of wavelengths of the incident radiation.

17. The system of claim 13, wherein the doping material is capable of absorbing and scattering radiation at a plurality of specific wavelengths to generate the spectral signature, the absorbed and scattered radiation having different intensities at each of the plurality of specific wavelengths; and wherein the sensor is configured to detect the intensities at each of the plurality of specific wavelengths in the spectral signature.

18. The system of claim 13, wherein the polymer material is biaxially oriented poly-propylene.

19. The system of claim 13, wherein the item is currency.

20. The system of claim 13, wherein the doping material is added to the polymer material at 0.01-10% loadings by weight.

* * * * *